US012691846B2

(12) United States Patent
Kobayashi et al.

(10) Patent No.: US 12,691,846 B2
(45) Date of Patent: Jul. 28, 2026

(54) AIR BAG DEVICE

(71) Applicant: AUTOLIV DEVELOPMENT AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 72 days.

(21) Appl. No.: 18/862,802

(22) PCT Filed: Mar. 24, 2023

(86) PCT No.: PCT/JP2023/011736
§ 371 (c)(1),
(2) Date: Jun. 24, 2025

(87) PCT Pub. No.: WO2023/218769
PCT Pub. Date: Nov. 16, 2023

(65) Prior Publication Data
US 2026/0116331 A1 Apr. 30, 2026

(30) Foreign Application Priority Data
May 10, 2022 (JP) ................................ 2022-077423

(51) Int. Cl.
*B60R 21/207* (2006.01)
*B60R 21/231* (2011.01)
(Continued)

(52) U.S. Cl.
CPC .......... *B60R 21/233* (2013.01); *B60R 21/207* (2013.01); *B60R 21/23138* (2013.01);
(Continued)

(58) Field of Classification Search
CPC ........... B60R 21/207; B60R 21/23138; B60R 2021/0048; B60R 2021/23146
(Continued)

(56) References Cited

U.S. PATENT DOCUMENTS 10,926,735 B2 * 2/2021 Deng ..................... B60R 21/231
11,364,871 B2 * 6/2022 Kobayashi ............ B60R 21/233
(Continued)

FOREIGN PATENT DOCUMENTS

JP 2009-006860 A 1/2009
JP 2010-115947 A 5/2010
(Continued)

*Primary Examiner* — Toan C To
(74) *Attorney, Agent, or Firm* — Harness, Dickey & Pierce, P.L.C.

(57) ABSTRACT

An airbag device in which the deployment behavior of a cushion is stable when expanded and deployed and the cushion does not tilt while restraining an occupant, even in a vehicle in which a console box is lower than the upper surface of a seat cushion or in a vehicle without a console box. The airbag device 1 includes a cushion 2 and an inflator 3 that injects gas to expand the cushion 2. The cushion 2 has a main chamber 2d that expands and deploys on one side of the occupant, and a lower chamber 2e that extends downward from a part of the main chamber 2d. The lower chamber 2e is formed so that, when expanded and deployed, a lower end part of the lower chamber 2e can come into contact with the upper surface of a console box.

10 Claims, 11 Drawing Sheets

(51) Int. Cl.
    *B60R 21/233*      (2006.01)
    *B60R 21/239*      (2006.01)
    *B60R 21/00*       (2006.01)

(52) U.S. Cl.
    CPC .... *B60R 21/239* (2013.01); *B60R 2021/0048*
       (2013.01); *B60R 2021/23146* (2013.01); *B60R*
                         *2021/23308* (2013.01)

(58) Field of Classification Search
    USPC ...................................................... 280/730.2
    See application file for complete search history.

(56)                References Cited

U.S. PATENT DOCUMENTS

| | | | |
|---|---|---|---|
| 11,577,682 B1 * | 2/2023 | Bates | B60R 21/214 |
| 11,851,020 B1 * | 12/2023 | Deng | B60R 21/23138 |
| 11,912,225 B2 * | 2/2024 | Azuma | B60R 21/23138 |
| 12,134,363 B2 * | 11/2024 | Ueda | B60R 21/207 |
| 12,291,163 B2 * | 5/2025 | Kobayashi | B60R 21/23138 |
| 2014/0151984 A1 * | 6/2014 | Fukawatase | B60R 21/23138 |
| | | | 280/730.2 |
| 2017/0232922 A1 | 8/2017 | Wiik et al. | |
| 2020/0317155 A1 | 10/2020 | Deng et al. | |
| 2023/0128759 A1 * | 4/2023 | Deng | B60R 21/2338 |
| | | | 280/743.2 |
| 2024/0140348 A1 * | 5/2024 | Jang | B60R 21/233 |

FOREIGN PATENT DOCUMENTS

| | | | |
|---|---|---|---|
| JP | 2010-221739 A | 10/2010 | |
| JP | 2017-149351 A1 | 8/2017 | |
| KR | 10-2011-0047559 A | 5/2011 | |
| WO | 2019/228898 A1 | 12/2019 | |

* cited by examiner

AIR BAG DEVICE

TECHNICAL FIELD

The present invention relates to an airbag device installed in the side surface of a backrest of one of seats provided side by side in a width direction of a vehicle at the center of the vehicle cabin in the width direction (may be called far side below).

CONVENTIONAL TECHNOLOGY

Conventional airbag devices with occupant restraint performance for far-side impacts are known. In this type of airbag device, the cushion is expanded and deployed in the center of the passenger compartment to protect the far side of the occupant.

Patent Document 1 describes an inter-seat airbag device that is provided in a console box installed between the driver's seat and the passenger seat. The cushion of this inter-seat airbag device includes a main bag that expands and deploys in an I-shape when viewed from the front, and a sub-bag that expands and deploys protruding from the vertical center of the main bag toward the passenger seat when gas is supplied through the main bag.

PRIOR ART DOCUMENTS

Patent Documents

Patent Document 1: Japanese Unexamined Patent Application 2010-115947

SUMMARY OF THE INVENTION

Problem to be Solved by the Invention

In a conventional inter-seat airbag device, the shape of the cushion is specified on the assumption that a console box is installed between the driver's seat and the passenger seat, and that the height of the console box is higher than the upper surface position of the seat cushion. Specifically, the cushion of a conventional inter-seat airbag device is often shaped so that the bottom surface of the cushion comes into contact with the top surface of the console box when expanded and deployed. By adopting such a shape, a reaction force is obtained from the console box when the cushion is expanded and deployed, and the console box can be used as support.

Therefore, when a conventional inter-seat airbag device is applied to a vehicle in which the console box is lower than the upper surface of the seat cushion or in a vehicle that does not have a console box, no reaction force is obtained from the console box when the airbag is expanded and deployed, and the stability of the deployment behavior of the cushion is lost. In addition, in conventional inter-seat airbag devices, the lower part of the cushion is not stable during occupant restraint, so the cushion is prone to tilting, which reduces the occupant restraint performance.

In the course of considering compliance with the latest Euro-NCAP protocol, the inventors of the present application came to the conclusion that in order to improve performance during a far-side collision in vehicles with a low console box (or no console box), improving the shape of the cushion would be desirable.

In light of the circumstances described above, an object of the present invention is to provide an airbag device in which the deployment behavior of the cushion is stable when expanded and deployed, and the cushion does not tilt during occupant restraint, even in vehicles in which the console box is lower than the top surface of the seat cushion or in vehicles that do not have a console box.

Means for Solving the Problem

The present invention is an airbag device installed on a vehicle center side surface of a seat backrest of one of seats arranged side by side in the width direction of the vehicle. The airbag device of the present invention includes:

a cushion; and an inflator that injects gas to expand the cushion, wherein the cushion includes:

a main chamber that expands and deploys on one side of the seat; and a lower chamber extending downward from a part of the main chamber; and the lower chamber is formed so that when expanded and deployed, a lower end part of the lower chamber can come into contact with an upper surface of a console box positioned lower than an upper surface of a seat cushion of the seat or with a floor of the vehicle.

The present invention may be configured with a main chamber that includes:

a first portion that receives a side of an occupant sitting in one of the seats arranged side by side in the width direction of the vehicle;

a second portion that receives a side of an occupant sitting in another of the seats; and a central portion provided between the first portion and second portion, and the lower chamber that extends downward from the central portion.

With the present invention, the main chamber may be formed by continuously and integrally forming the first portion, the central portion, and the second portion, and the lower chamber is formed as a separate chamber segregated from the main chamber.

The present invention may be configured such that the main chamber and the lower chamber are in communication through a first vent hole.

The present invention may be configured such that the inflator is attached to the main chamber and a part of the gas injected from the inflator is supplied from the main chamber, through the first vent hole, and into the lower chamber.

The present invention may further include a protruding part provided in the central portion that protrudes in a forward direction of the vehicle at least further than the first portion and the second portion when the cushion is expanded and deployed, and that is capable of receiving a head of the occupant and the occupant moving diagonally forward.

With the present invention, the main chamber may be formed by continuously and integrally forming the first portion, the central portion, and the second portion, and the protruding part is formed as a separate chamber segregated from the main chamber.

The present invention may be configured such that the main chamber and the protruding part are in communication through a second vent hole.

The present invention may include a connecting member connecting the lower front portion of the protruding part to the bottom front portion of the lower chamber.

The present invention may include a connecting member connecting the lower front portion of the protruding part to the lower front portion of the central portion.

Effect of the Invention

The cushion of the airbag device of the present invention has a main chamber that expands and deploys on one side of the seat, specifically on the far side of the seat, as well as a lower chamber that extends downward from a part of the main chamber. The lower chamber is formed in a shape so that, when expanded and deployed, a lower end part of the lower chamber can come into contact with the upper surface of a console box, which is positioned lower than the upper surface of the seat cushion of the seat, or the floor surface of the vehicle. Therefore, with the present invention, even if applied to a vehicle in which the height of the console box is lower than the upper surface of the seat cushion, the lower chamber expands and deploys to fill the space lower than the upper surface of the seat cushion. In addition, when the present invention is applied to a vehicle that does not have a console box, the lower chamber expands and deploys so as to fill the entire space corresponding to the console box.

Therefore, with the present invention, the lower chamber that expands and deploys during a side collision supports the lower portion of the main chamber that protects the side of the occupant. With the present invention, due to the presence of this support portion, when the cushion is expanded and deployed, vertical oscillation is reduced, and the deployment behavior of the cushion is stabilized. Therefore, with the present invention, inclination of the cushion when expanding and deployment are finished can be prevented.

EMBODIMENTS OF THE INVENTION

Embodiments of the present invention are described below in detail with reference to the drawings. Note that the following embodiments are examples of the present invention, and are not intended to limit the scope of the present invention, the application, or the uses thereof.

Without presenting an example, the "occupant" in the present invention is defined to be a frontal collision test dummy (Hybrid III AM50; human body dummy for frontal collision test set forth in specification [49CFR Part 572 Subpart E and O] of NHTSA [National Highway Traffic Safety Administration]) with a physique equivalent to the average male in the United States, having an approximate size of 175 cm height, 88 cm sitting height, and 78 kg weight. However, the present invention can also be applied for other anthropomorphic dummies.

In addition, in this specification, "upper" and "upper side" may refer to the head direction of an occupant P seated in the correct position of the seats Sd, Sn, and "lower" and "lower side" may refer to the foot direction of an occupant P. Here, the "normal position" refers to the center position in the left-to-right direction of each seat cushion SC of the seats Sd, Sn, where the back of the occupant P contacts the backrest part SB from above and below. In addition, "front" and "front side" may refer to the front direction of an occupant P seated in the correct position of the seats Sd, Sn, while "rear" and "rear side" may refer to the back direction of the occupant P. In addition, "left" and "left side" may refer to the left side of an occupant P sitting in the correct position on the seats Sd, Sn, and "right" and "right side" may refer to the right side of an occupant P.

In the present Embodiment, an airbag device 1 is installed inside the far side of the seat backrest part SB of one of two seats (for example, the driver's seat Sd and the passenger seat Sn) arranged next to each other in the width direction of the vehicle. FIGS. 1A to 1D depict an example in which the airbag device 1 is provided on the driver's seat Sd side. The seat (driver's seat Sd) on which the airbag device 1 is mounted will be described below, prior to describing the airbag device 1.

Schematic Configuration of Seat

Figure 7:
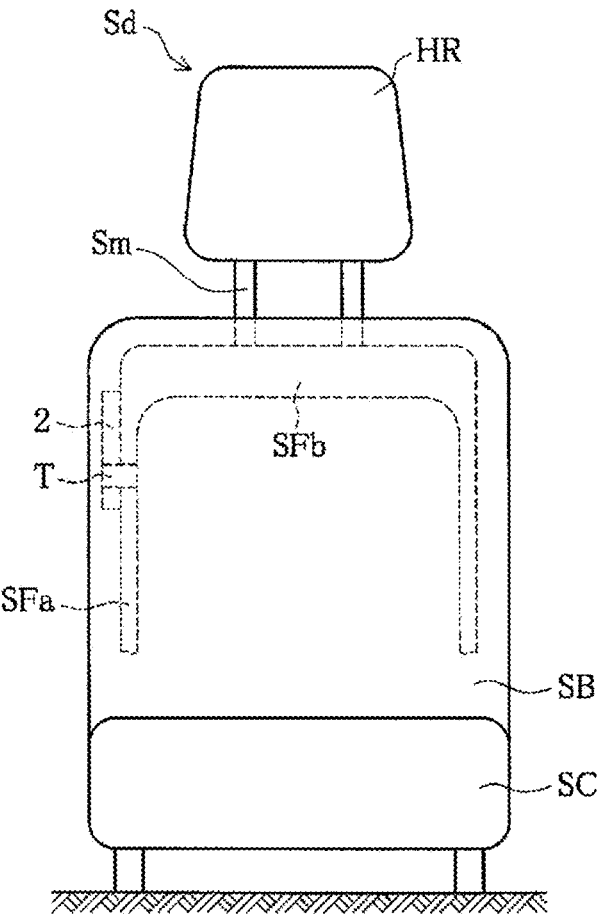
FIG. 7 is a front view of the seat in a state in which the cushion is stowed.

As depicted in FIG. 7, the driver's seat Sd includes a seat cushion SC and a backrest part SB. A headrest HR is attached to the upper end part of the backrest part SB via a rod-shaped support member Sm. The driver's seat Sd may have the backrest part SB and the headrest HR integrally formed therewith. In FIG. 7, there is a door (not depicted) on the right side of the page. The side of the driver's seat Sd furthest from the door is the far side.

The seat cushion SC has a pad provided on the upper side of a seat pan (not depicted), and the pad is covered with a cover material. In the backrest part SB, a pad is provided on the front side of seat frames SFa, SFb, and the pad is covered with a cover material.

The cushion 2 in a flat state is rolled up or folded into a bellows shape for a stowed state when stowed in the seat Sd. As indicated in FIG. 7, the cushion 2 in the stowed state is stowed along a side part SFa of the seat frame of the seat Sd.

Specifically, the cushion 2 is stowed within the far side of the seat Sd. In the present Embodiment, the cushion 2 in the stowed state is secured to the far side part SFa of the seat frame using a securing brace T. Therefore, the positional displacement of the cushion 2 during a collision or the like can be suppressed. The arrangement and number of the securing brace T is not limited to that indicated in the present Embodiment.

Configuration of Airbag Device

Figure 1A:
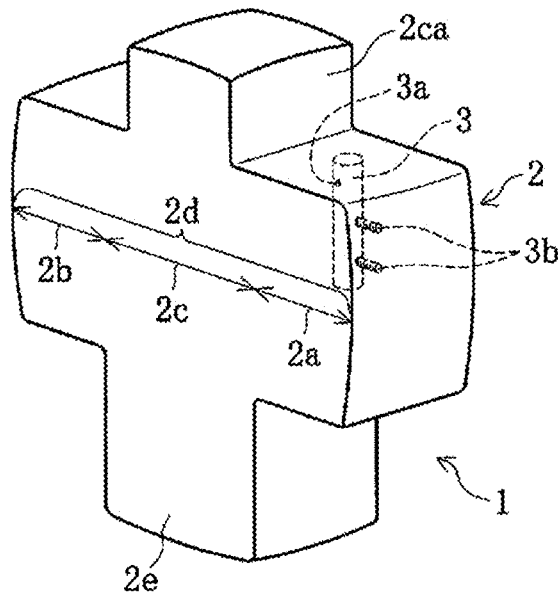
FIG. 1A is a perspective view of a cushion in an airbag device according to the Embodiment after expansion and deployment is finished, as viewed from an oblique direction.
Figure 1B:
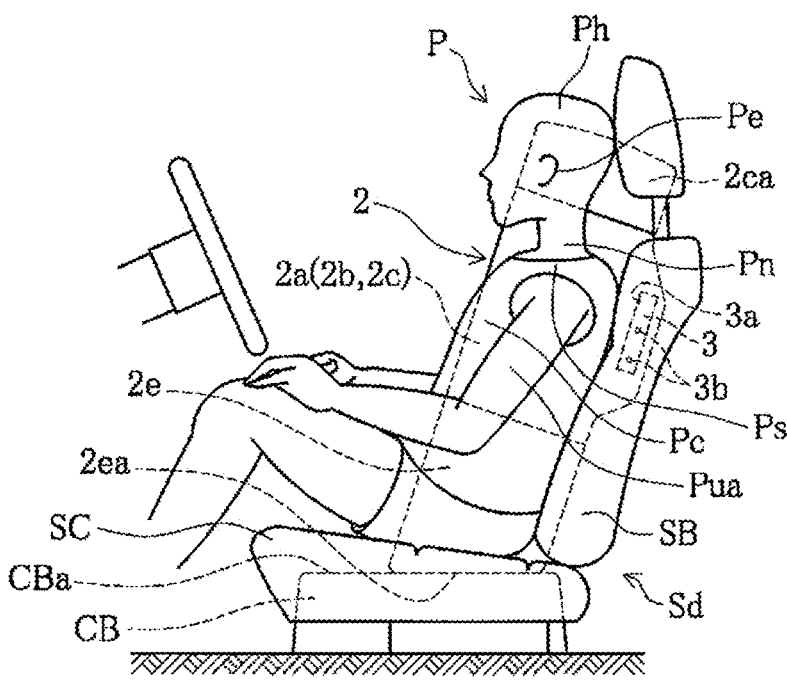
FIG. 1B is a view of the airbag device of FIG. 1A in a state where a cushion is expanded and deployed, as viewed from a side of the vehicle.
Figure 1C:
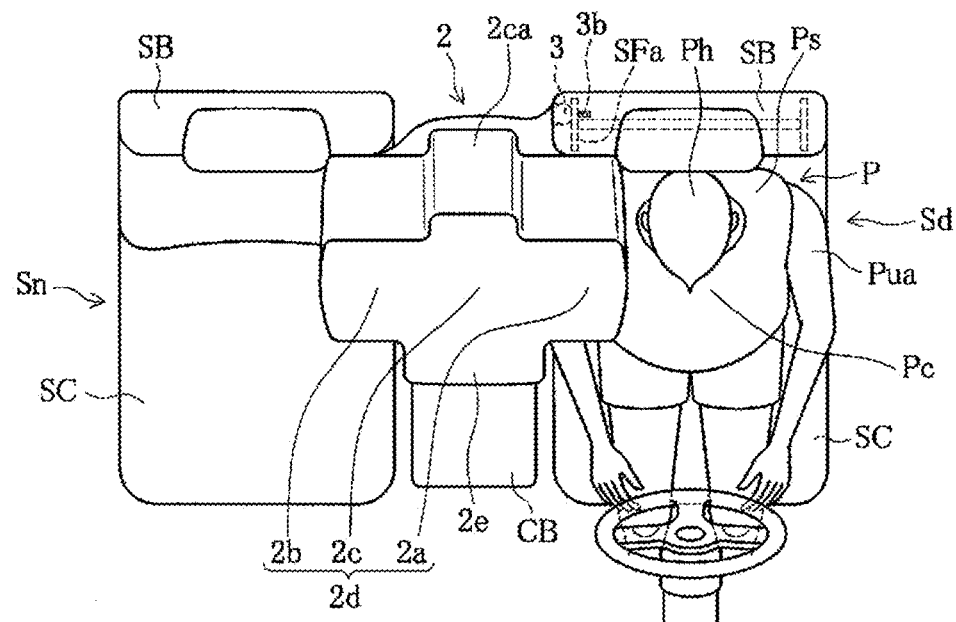
FIG. 1C is a view of the airbag device of FIG. 1A in a state where a cushion is expanded and deployed, as viewed from above the vehicle.

The airbag device 1 includes a cushion 2 and an inflator 3 (see FIG. 1C). The cushion 2 is a bag made of cloth that is constructed by preparing a required number of base cloths of a required shape in advance and sewing prescribed locations such as the periphery of these base cloths. The inflator 3 is a device for injecting gas that causes the cushion 2 to expand.

In the airbag device 1, a cylindrical inflator 3 is arranged inside a cushion 2 and, upon receiving a signal from a sensor, injects gas into the interior of the cushion 2 through a hole 3a provided in the outer surface of the cushion.

The cushion 2 is attached to the side part SFa of the side frame inside the backrest part SB using two stud bolts 3b that are provided at appropriate spacing, protruding in the longitudinal direction on the outer surface of the inflator 3, on the side opposite the hole 3a. Note that in the case where the cushion 2 can be secured by the stud bolt 3b of the inflator 3 as in the present Embodiment, securing brace T for securing the cushion 2 can be omitted.

In the stowing part for the inflator 3, the inflator 3 is secured to a side part SFa of the seat frame by the stud bolt 3b. With this securing, the stowed part is also secured to the side part SFa of the seat frame by passing the stud bolt 3b through an insertion hole in the stowed part.

Cushion when Fully Expanded

The state of expansion and deployment being complete (hereinafter called "expansion completed state"). The configuration of the cushion 2 will be described with reference to FIG. 1A to FIG. 1D. Note that in FIG. 1B, the occupant P is assumed to be seated in a normal position.

A main chamber 2d of the cushion 2 includes a first portion 2a and a second portion 2b that expand and deploy so as to ride over the front of the driver's seat Sd and the front of the passenger seat Sn to protect the far side of the occupant P seated in the driver's seat Sd and/or the passenger seat Sn, and a central portion 2c that expands and deploys between the first portion 2a and the second portion 2b. Specifically, the first portion 2a restrains the side of the occupant P seated in the driver's seat Sd, and the second portion 2b restrains the side of the occupant P seated in the passenger seat Sn. Note that the boundaries of the first portion 2a, the second portion 2b, and the central portion 2c are not precise. In addition, the vertical, front-to-back, and left-to-right dimensions of the main chamber 2d are not limited to those indicated in the drawings, and can be adjusted in accordance with the shape and arrangement of the seats Sd, Sn.

In the present Embodiment, the first portion 2a, the second portion 2b, and the central portion 2c are integrally formed as one main chamber 2d. When viewed from the front of the vehicle, the main chamber 2d is formed by joining a suitable number of base material panels so that the shape of an extended part 2ca in the central portion 2c extending above the first portion 2a and the second portion 2b has the necessary thickness in the front-rear direction of the vehicle.

The first portion 2a and the second portion 2b have a length in the vertical direction and the front-rear direction that can capture the side parts of the torso of an occupant P, for example, the shoulder Ps, the chest Pc, and the upper arms Pua. In addition, the central portion 2c has a length in the vertical direction and in the front-rear direction that is able to capture the side part of the occupant P, and due to the extended part 2ca thereof, can capture, for example, the rear side of a head Ph of the occupant P, from a neck Pn to an ear Pe.

With the airbag device 1, when a side collision, an oblique collision, an offset collision, or the like occurs, the inflator 3 receives a signal from the sensor and discharges gas from a hole 3a provided on the outer surface thereof into the main chamber 2d, thereby expanding and deploying the main chamber 2d. In the event of a side collision, the first portion 2a and the second portion 2b expand and deploy, riding up onto the front of the driver's seat Sd and the passenger seat Sn, and capture, for example, a shoulder Ps, chest Pc, and upper arms Pua of the occupant P who moves due to the impact, thereby suppressing movement of the occupant P.

Here, if the height of the console box CB is higher than the position of the upper surface of the seating surface of the seat cushion SC of the seats Sd, Sn, even if the cushion 2 is composed of only the main chamber 2d, the bottom surface of the expanded and deployed main chamber 2d can be supported by the upper surface of the console box CB. However, in the case of a vehicle in which the upper surface of the console box CB is lower than the upper surface of the seat cushion SC, the console box CB cannot support the bottom surface of the main chamber 2d when the main chamber is expanded and deployed.

Figure 1D:
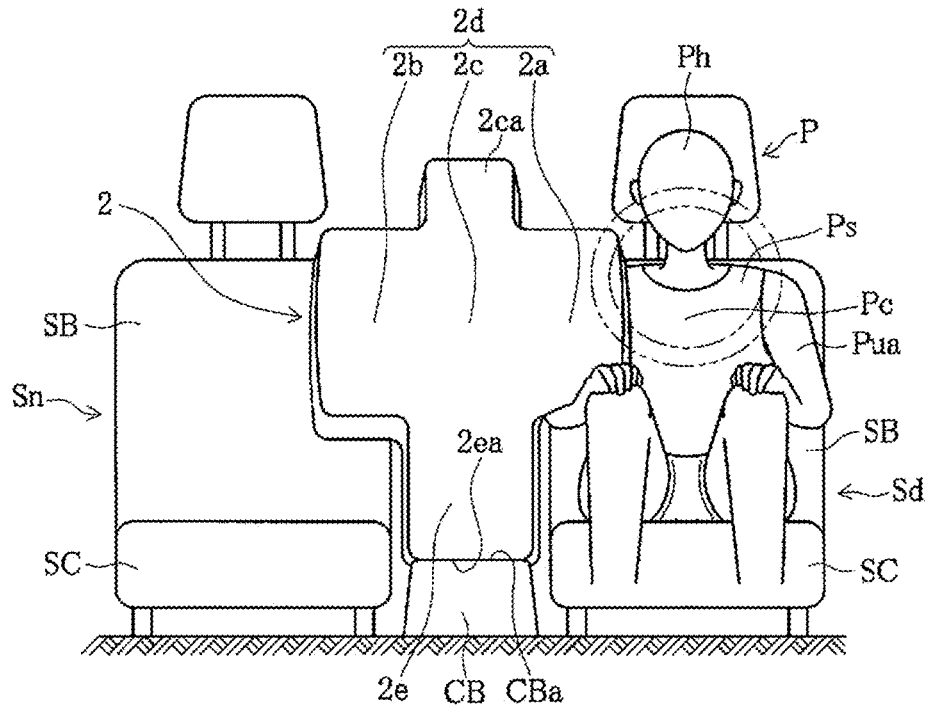
FIG. 1D is a view of the airbag device of FIG. 1A in a state where a cushion is expanded and deployed, as viewed from a front of the vehicle.
Figure 2A:
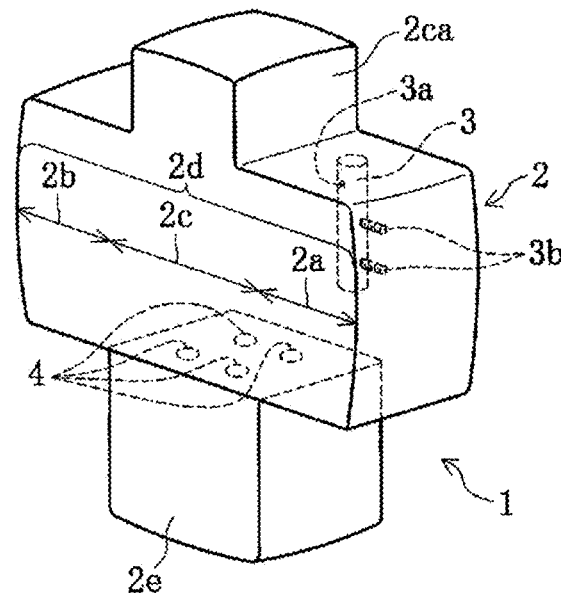
FIG. 2A is a perspective view of a cushion in an airbag device according to a First Variation of the Embodiment after expansion and deployment is finished, as viewed from an oblique direction.
Figure 2B:
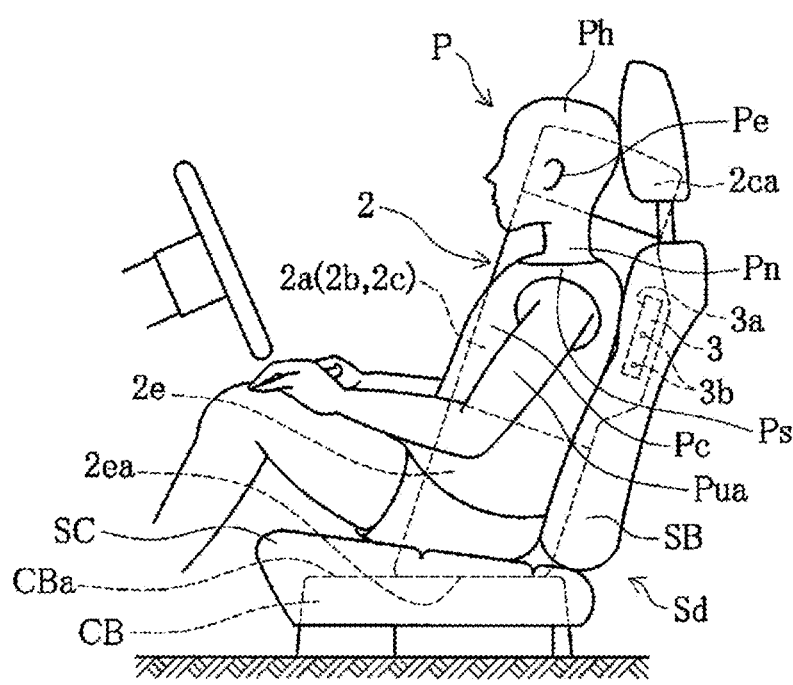
FIG. 2B is a view of the airbag device of FIG. 2A in a state where a cushion is expanded and deployed, as viewed from a side of the vehicle.
Figure 2C:
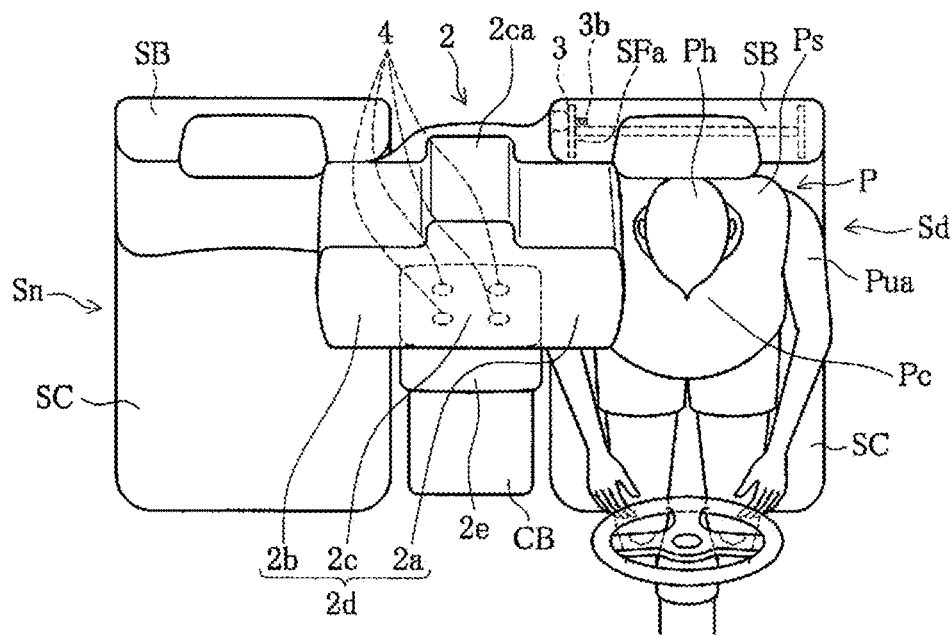
FIG. 2C is a view of the airbag device of FIG. 2A in a state where a cushion is expanded and deployed, as viewed from above the vehicle.
Figure 2D:
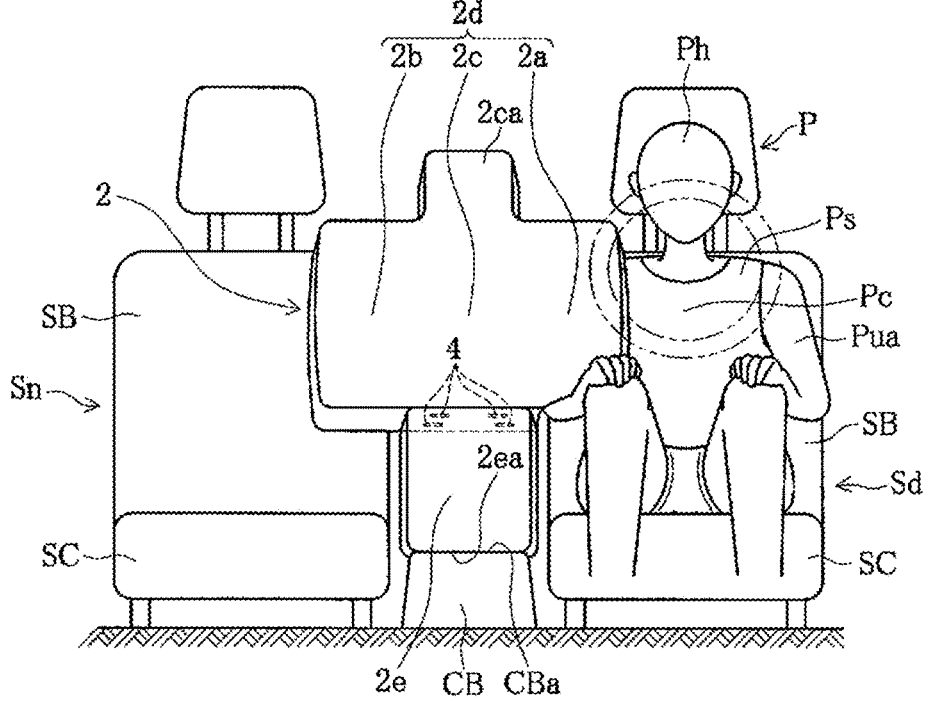
FIG. 2D is a view of the airbag device of FIG. 2A in a state where a cushion is expanded and deployed, as viewed from a front of the vehicle.
Figure 3A:
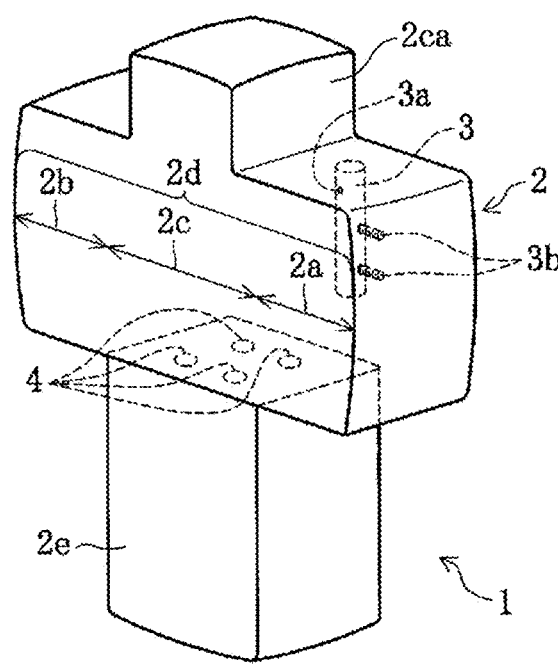
FIG. 3A is a perspective view of a cushion in an airbag device according to a Second Variation of the Embodiment after expansion and deployment is finished, as viewed from an oblique direction.
Figure 3B:
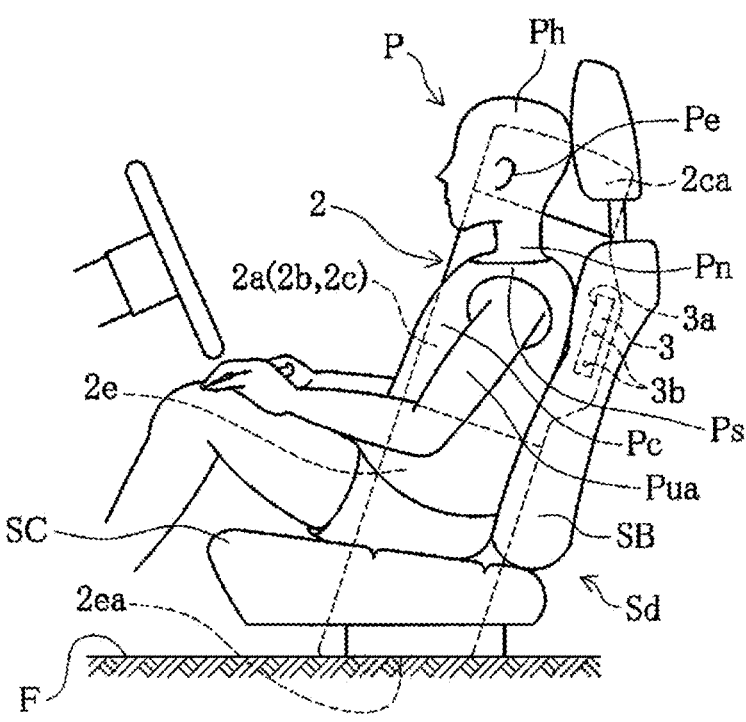
FIG. 3B is a view of the airbag device of FIG. 3A in a state where a cushion is expanded and deployed, as viewed from a side of the vehicle.
Figure 3C:
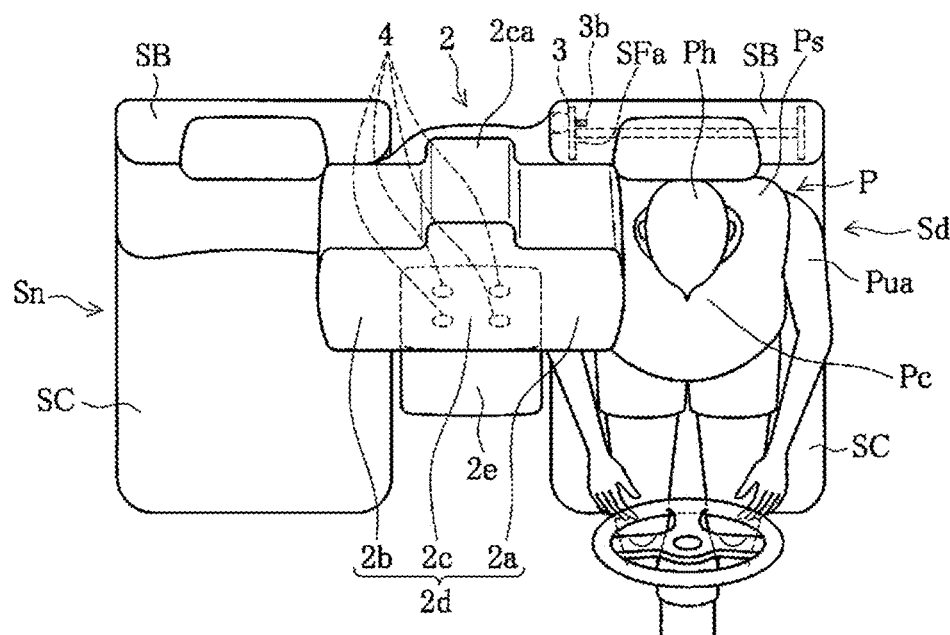
FIG. 3C is a view of the airbag device of FIG. 3A in a state where a cushion is expanded and deployed, as viewed from above the vehicle.
Figure 3D:
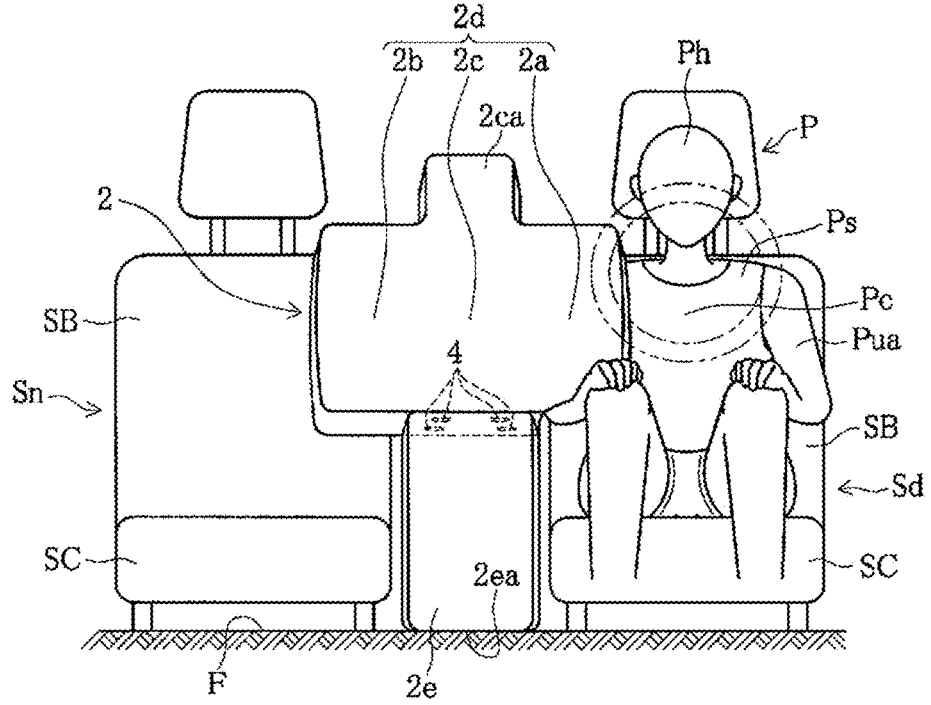
FIG. 3D is a view of the airbag device of FIG. 3A in a state where a cushion is expanded and deployed, as viewed from a front of the vehicle.
Figure 4A:
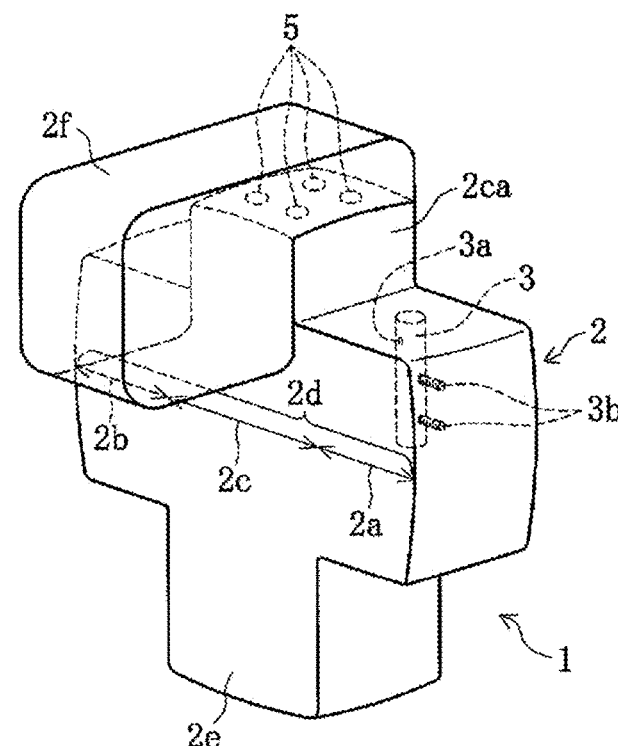
FIG. 4A is a perspective view of a cushion in an airbag device according to a Third Variation of the Embodiment after expansion and deployment is finished, as viewed from an oblique direction.
Figure 4B:
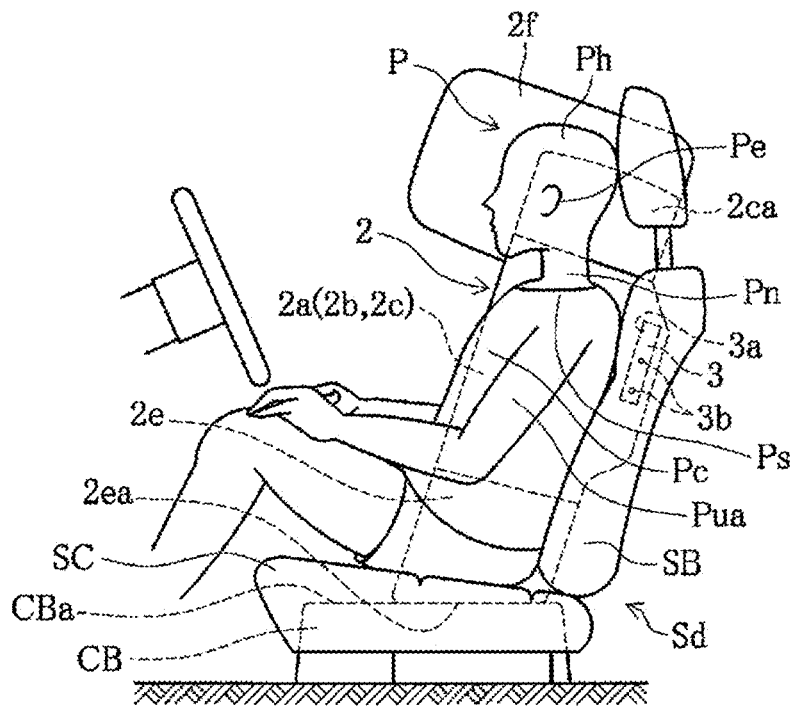
FIG. 4B is a view of the airbag device of FIG. 4A in a state where a cushion is expanded and deployed, as viewed from a side of the vehicle.
Figure 4C:
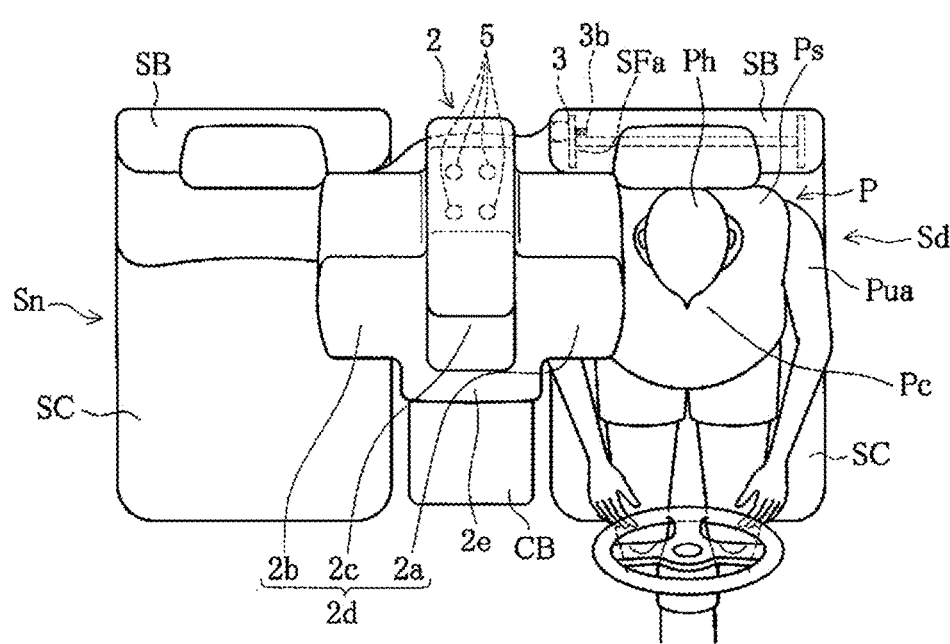
FIG. 4C is a view of the airbag device of FIG. 4A in a state where a cushion is expanded and deployed, as viewed from above the vehicle.
Figure 4D:
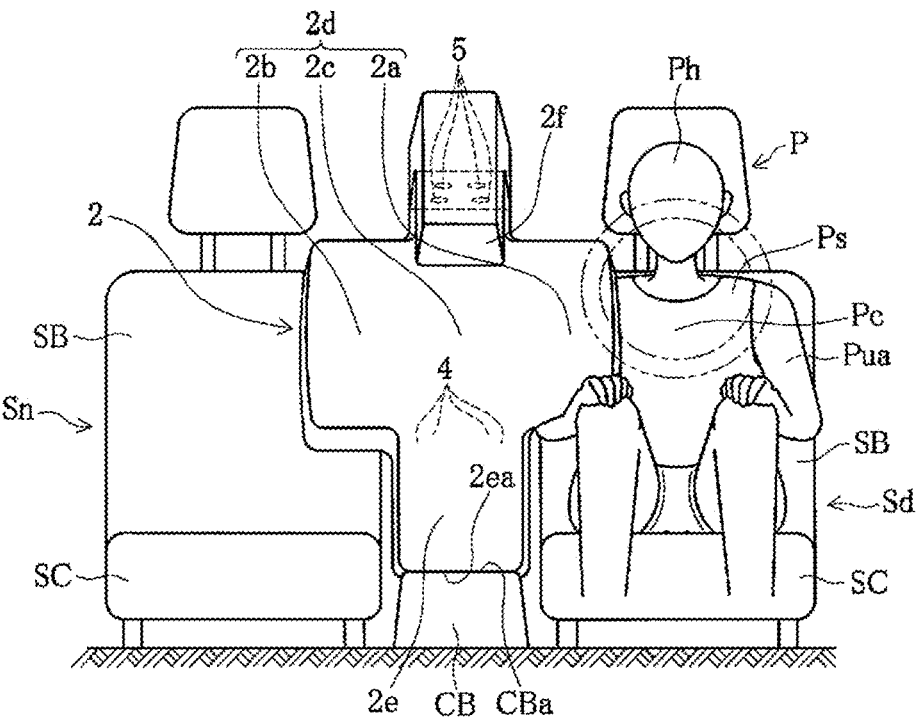
FIG. 4D is a view of the airbag device of FIG. 4A in a state where a cushion is expanded and deployed, as viewed from a front of the vehicle.

Therefore, the cushion 2 of the present Embodiment includes a lower chamber 2e that extends downward from a part of the main chamber 2d. Specifically, the lower chamber 2e extends downward from the central portion 2c of the main chamber 2d. The lower chamber 2e is formed so that, when expanded and deployed, a lower end part 2ea of the lower chamber 2e can come into contact with an upper surface CBa of the console box CB, which is located lower than the upper surface of the seat cushion SC of the seat Sd, as depicted in FIGS. 1B and 1D.

The lower chamber 2e is roughly rectangular, and the vertical length of the lower chamber 2e is determined so that a bottom surface 2ea of the lower chamber 2e reaches and comes into contact with the upper surface CBa of the console box CB when inflated and deployed. In addition, the width in the left-to-right direction of the lower chamber 2e is set to be the same as the width in the left-to-right direction of the console box CB installed between the driver's seat Sd and the passenger seat Sn. Alternatively, the left-to-right width of the lower chamber 2e may be slightly longer than the left-to-right width of the console box CB so as to fit exactly in the space between the driver's seat Sd and the passenger seat Sn without creating a gap, or the width may be shorter than the left-to-right width of the console box CB.

The vertical, front-to-back direction, and left-to-right direction dimensions of the lower chamber 2e are not limited to those indicated in the drawings, and can be adjusted as appropriate in accordance with the shape and installation position of the seats Sd, Sn.

In the present Embodiment, the lower chamber 2e is formed by joining a suitable number of base material panels so as to protrude downward from the main chamber 2d. In the present Embodiment, the lower chamber 2e is formed integrally with the main chamber 2d, forming a single bag body.

A gas guide may be provided in the housing of the inflator 3. The gas guide may be configured to have, as outlets for gas injected from the inflator 3, a first outlet into the main chamber 2d and a second outlet into the lower chamber 2e.

Effects of the Present Embodiment

In the present Embodiment, the cushion 2 includes a main chamber 2d that expands and deploys toward the far side of one of the seats Sd, Sn to suppress movement of the occupant P, who tends to move in the direction of the impact, as well as a lower chamber 2e that extends downward from the central portion 2c of the main chamber 2d. Furthermore, the lower chamber 2e is configured in a shape that, when expanded and deployed, enables the lower end part 2ea of the lower chamber 2e to come into contact with the upper surface CBa of the console box CB, which is located lower than the upper surfaces of the seat cushions SC of the seats Sd, Sn.

Thus, with the present Embodiment, even if applied to a vehicle where the height of the console box CB is lower than the upper surface of the seat cushion SC of the seats Sd, Sn, the lower chamber 2e expands and deploys downwards so as to fill the space lower than the upper surface of the seat cushion SC.

Therefore, with the present Embodiment, the expanded and deployed lower chamber 2e supports the lower portion of the main chamber 2d that protects the side of the occupant P. With the present Embodiment, due to the presence of this support portion, when the cushion 2 is expanded and deployed, vertical oscillation is reduced, and the deployment behavior of the cushion 2 is stabilized.

In a side collision from the far side of the vehicle, in the early stage of the collision, the occupant P moves toward the side where the collision has occurred based on inertial force. Specifically, when a far-side collision occurs with respect to the occupant P seated in the driver's seat Sd, the occupant P collides with the first portion 2a of the main cushion 2 in the early stage of the collision.

At this time, with the present Embodiment, the expanded and deployed lower chamber 2e supports the lower portion of the main chamber 2d that protects the side of the occupant P. Therefore, according to the present Embodiment, inclination of the cushion 2 when expanding and deployment are finished can be prevented.

With the airbag device 1 of the present Embodiment, the deployment behavior of the cushion 2 is stable, and high restraint performance is exhibited relative to a side collision from the far side.

With the present Embodiment, the main chamber 2d has both the first portion 2a that restrains the side of the occupant P seated in the driver's seat Sd, and the second portion 2b that restrains the side of the occupant P seated in the passenger seat Sn. Therefore, the occupant P in either of the seats Sd, Sn can be appropriately protected, and the restraint performance for the occupant P can be improved. In addition, even when the occupant P in the driver's seat Sd moves toward the opposite side from the initial stage of the collision due to the impact force of the collision, the occupant P can effectively avoid collision with the occupant in the passenger seat Sn.

First Variation of the Embodiment

In the present Variation, as depicted in FIGS. 2A to 2D, the lower chamber 2e is formed as a separate chamber separated from the main chamber 2d. The lower chamber 2e is formed into a rectangular parallelepiped shape by joining an appropriate number of base material panels so as to protrude downward from the main chamber 2d, and is then joined to the underside of the main chamber 2d. The lower chamber 2e of the present Variation communicates with the main chamber 2d via a first vent hole 4 provided in the lower surface of the central portion 2c of the main chamber 2d.

In the present Variation, in the event of a side collision, the inflator 3 receives a signal from the sensor and discharges gas through the hole 3a provided in the outer surface into the main chamber 2d, thereby expanding and deploying the main chamber 2d. After the main chamber 2d is expanded and deployed, gas flows into the lower chamber 2e through the first vent hole 4, causing the lower chamber 2e to expand and deploy.

Here, the number of first vent holes 4 and the size (inner diameter) of each hole may be designed taking into consideration the timing of expanding and deploying the lower chamber 2e. If the total opening area of the first vent holes 4 is made sufficiently large, gas can be quickly supplied to the lower chamber 2e almost simultaneously with expansion and deployment of the main chamber 2d, allowing the lower chamber 2e to expand quickly. Depending on design requirements, the total opening area of the first vent holes 4 can be adjusted to be slightly smaller, thereby creating a required time lag between the expansion and deployment of the main chamber 2d and the expansion and deployment of the lower chamber 2e.

In the present Variation, the lower chamber 2e is expanded and deployed downward so as to fill the space below the upper surface of the seat cushion SC. Furthermore, the lower chamber 2e serves as a support portion, stabilizing the main chamber 2d when expanded and deployed.

Therefore, even in a vehicle in which the console box CB is lower than the upper surface of the seat cushion SC, the vertical oscillation of the cushion 2 upon expansion and deployment is reduced, and the deployment behavior of the cushion 2 is stabilized. Furthermore, since the lower chamber 2e provides support, the cushion 2 can be prevented from tilting when expansion and deployment are complete. In particular, in the present Variation, by appropriately adjusting the total opening area of the first vent holes 4, timing of expansion and deployment of the lower chamber 2e can easily be optimized.

Second Variation of the Embodiment

Self-driving technology has been advancing in recent years. In self-driving vehicles, when driving in self-driving mode, the vehicle can travel autonomously without the need for a driver, which gives occupants greater freedom in terms of their posture and circumstances while driving. For example, the front row seats can be rotated 180 degrees from a forward-facing direction relative to the vehicle, enabling occupants seated in the front row seats to face and converse with occupants seated in the rear row seats while the vehicle is traveling. Therefore, a vehicle is considered where a console box is not provided between the driver's seat Sd and the passenger seat Sn in order to enable the seats to be rotated freely.

The present Variation is applicable to a vehicle that does not have a console box as described above. In the present Variation, as depicted in FIGS. 3A to 3D, the lower chamber 2e is configured in a shape that enables the lower end part 2ea of the lower chamber 2e to come into contact with the floor surface F of the vehicle when expanded and deployed.

Specifically, the shape of the lower chamber 2e is a rectangular parallelepiped that is slightly longer in the vertical direction than in the embodiment described above. The vertical length of the lower chamber 2e is determined so that the bottom surface of the lower chamber 2e reaches and comes into contact with the floor surface F when expanded and deployed. The width of the lower chamber 2e in the left-to-right direction is set so as to fit into the space between the driver's seat Sd and the passenger seat Sn without creating a gap.

In the present Variation, when an impact is applied to the vehicle due to a collision or the like, the inflator 3 receives a signal from a sensor and injects gas into the main chamber 2d, causing the main chamber 2d to expand and deploy. In addition, a part of the gas injected into the main chamber 2d is supplied to the lower chamber 2e through the first vent hole 4. As a result, the lower chamber 2e expands and deploys downward so as to fill the entire space in the portion where the console box CB is located in a typical vehicle. Furthermore, the lower chamber 2e serves as a support portion, stabilizing the main chamber 2d when expanded and deployed.

Therefore, even in a vehicle without a console box CB, the vertical oscillation of the cushion 2 is reduced when the cushion 2 is expanded and deployed, and the deployment behavior of the cushion is stabilized. Furthermore, since the lower chamber 2e provides support, the cushion 2 can be prevented from tilting when expansion and deployment are complete. In this manner, due to the effect of the lower chamber 2e, the airbag device 1 exhibits an occupant restraint performance in the event of a side collision.

In the present Variation, the lower chamber 2e is formed as a chamber separate from the main chamber 2d, but the lower chamber 2e may be formed integrally with the main chamber 2d.

Third Variation of the Embodiment

In the case of the embodiment described above, the extended part 2ca of the central part 2c is for receiving a head Ph of the occupant P. However, there may be cases where further improvements in performance are required so that the entire head Ph of the occupant P can be more reliably received from the initial stage of a vehicle collision to the final stage when the effects of the collision have subsided.

In the present Variation, in order to more reliably support the entire head Ph of the occupant P, a protruding part 2f is formed on the central portion 2c of the cushion 2, which protrudes at least further forward than the first portion 2a and the second portion 2b when expanded and deployed, and is capable of supporting the entire head Ph of the occupant P. This protruding part 2f also has the function of receiving an occupant P who moves diagonally forward in the event of a collision from an oblique direction. The configuration of the lower chamber 2e in the present Variation is the same as that of the First Variation; therefore, a description thereof will be omitted.

As depicted in FIGS. 4A to 4D, the protruding part 2f is provided so as to cover the upper surface of the extended part 2ca so that the upper surface thereof is higher than the top of the head of the occupant P seated in the driver's seat Sd or the passenger seat Sn. A suitable number of base material panels are then sewn together to form the covered portion and a portion protruding forward from the front surface of the extended part 2ca.

The protruding part 2f is formed as a separate chamber segregated from the main chamber 2d. The protruding part 2f communicates with the main chamber 2d via a second vent hole 5 provided on the upper surface of the extended part 2ca.

The size (inner diameter) of the second vent hole 5 is set so that gas flows into the protruding part 2f in the latter half of the expansion and deployment of the main chamber 2d, creating a time lag between the expansion and deployment of the main chamber 2d and the expansion and deployment of the protruding part 2f.

In the present Variation in which a protruding part 2f is provided on the extended part 2ca, in the event of a side collision, the inflator 3 receives a signal from the sensor and injects gas into the main chamber 2d through a hole 3a provided on the outer surface thereof, causing the main chamber 2d to expand and deploy.

Furthermore, after the main chamber 2d has expanded and deployed to a certain extent, gas flows into the protruding part 2f through the second vent hole 5, causing the protruding part 2f to expand and deploy. In the present Variation, in the event of a far-side collision, the main chamber 2d, which has less time to protect the occupant P from the collision, can be expanded and deployed prior to the protruding part 2f. This expanded protruding part 2f can reliably capture the entirety of the occupant P and the head Ph thereof, which is moved by an impact, not only when the impact is applied from the side of the occupant P, but also when an oblique forward impact is applied to the occupant P.

Fourth Variation of the Embodiment

Figure 5A:
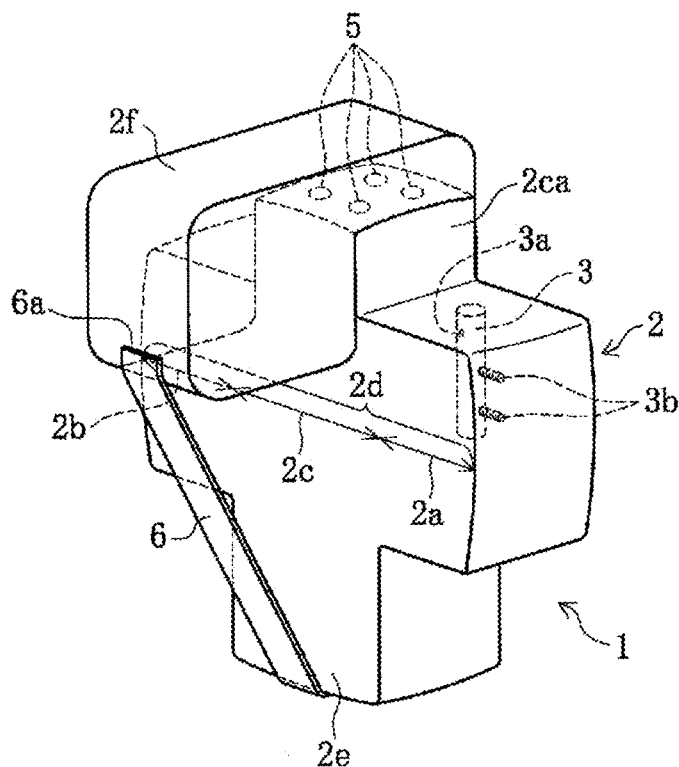
FIG. 5A is a perspective view of a cushion in an airbag device according to a Fourth Variation of the Embodiment after expansion and deployment is finished, as viewed from an oblique direction.
Figure 5B:
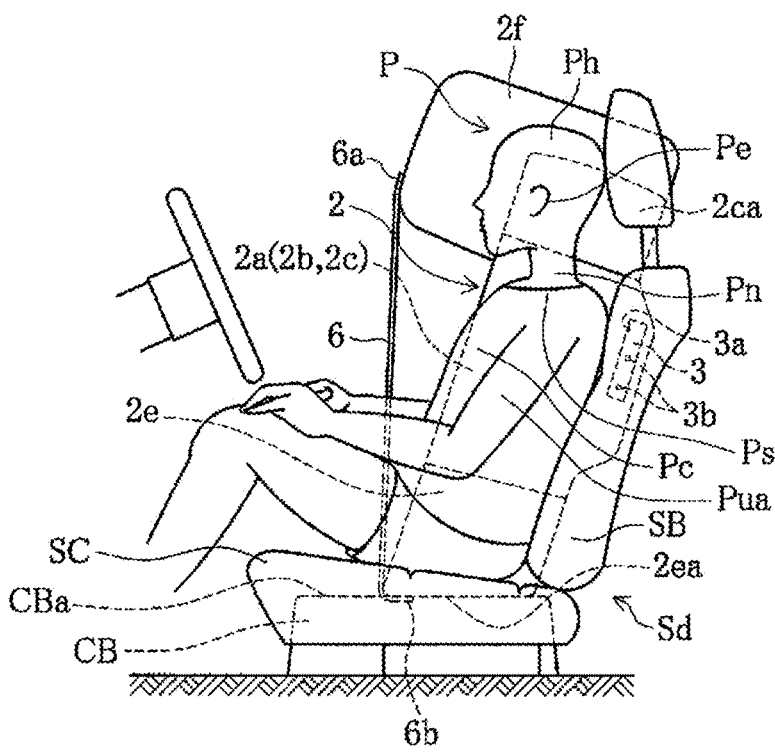
FIG. 5B is a view of the airbag device of FIG. 5A in a state where a cushion is expanded and deployed, as viewed from a side of the vehicle.

In the present Variation, a tether 6 connects the lower front portion of the protruding part 2f described in the Third Variation to the bottom front portion of the lower chamber 2e. A first end 6a of the tether 6 is sewn to the lower front portion of the protruding part 2f as depicted in FIGS. 5A and 5B. A second end 6b of the tether 6 is sewn to the bottom front portion of the lower chamber 2e. The tether 6 corresponds to a connecting member.

The tether 6 is a string-like or narrow band-like member. The tether 6 may be made of the same material as the base material constituting the cushion 2. For example, a non-stretchable material can be suitably used for the tether 6, but a stretchable material can also be used.

In the present Variation, the protruding part 2f is stabilized by connecting the protruding part 2f and the lower chamber 2e with a tether 6, so that even in the event of a collision from the side, or the like, when the head Ph of the occupant P moves and collides against the forward-expanded portion of the extended part 2ca of the protruding part 2f, movement of the head Ph can be effectively suppressed.

Fifth Variation of the Embodiment

Figure 6A:
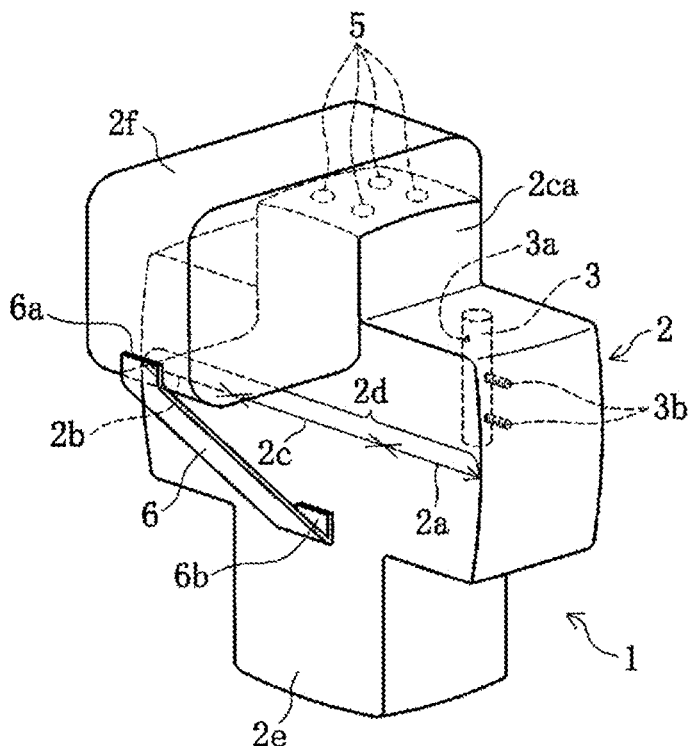
FIG. 6A is a perspective view of a cushion in an airbag device according to a Fifth Variation of the Embodiment after expansion and deployment is finished, as viewed from an oblique direction.
Figure 6B:
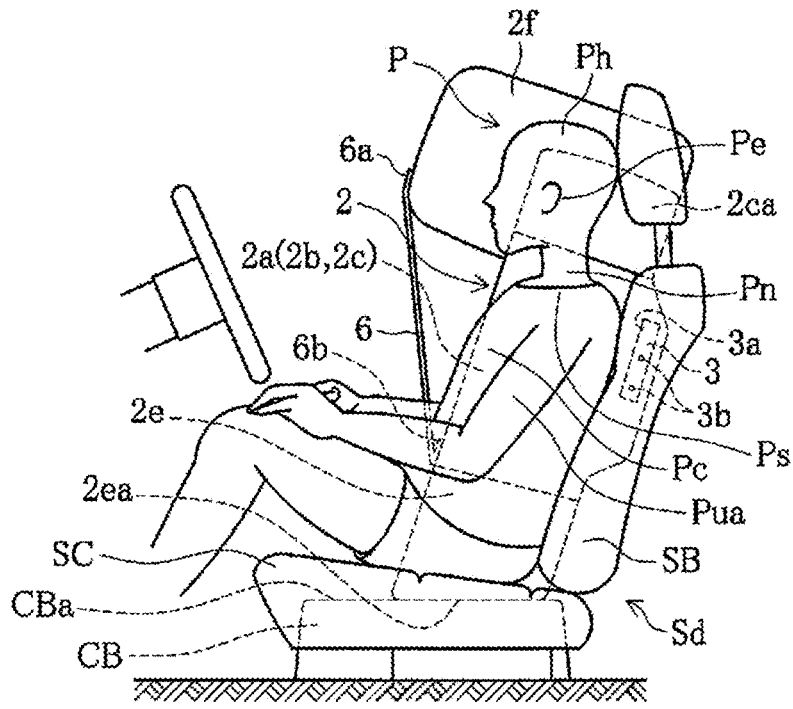
FIG. 6B is a view of the airbag device of FIG. 6A in a state where a cushion is expanded and deployed, as viewed from a side of the vehicle.

In the present Variation, a tether 6 connects the lower front portion of the protruding part 2f described in the Third Variation to the lower front portion of the central portion 2c of the main chamber 2d. A first end 6a of the tether 6 is sewn to the lower front portion of the protruding part 2f as depicted in FIGS. 6A and 6B. In addition, a second end 6b of the tether 6 is sewn to the lower front portion of the central portion 2c of the main chamber 2d.

The Fifth Variation, in which the attachment position of the second end 6b of the tether 6 is changed, also provides the same effects as the Fourth Variation.

In the Fourth Variation and the Fifth Variation, the attachment position of the first end 6a of the tether 5 [sic] to the protruding part 2f can be changed from the lower front portion to the bottom front portion of the protruding part 2f. In this case as well, the same effects as those of the Fourth Variation and the Fifth Variation are achieved. In addition, the configuration and functions of the lower chamber 2e in the present Variation are the same as those in the First Variation.

Other Variations

In the embodiment described above, the bottom surface of the lower chamber 2e may be provided with an anti-slip portion having a friction coefficient greater than that of the surface of the base material panel that constitutes the lower chamber 2e. By providing a non-slip portion having a large friction coefficient on the bottom surface of the lower chamber 2e, when the lower chamber 2e expands and deploys and the bottom surface of the lower chamber 2e comes into contact with the upper surface of the console box CB or the floor surface F of the passenger compartment, the bottom surface of the lower chamber 2e becomes less slippery and is more likely to remain in a prescribed position. Note that such a non-slip portion having a large coefficient of friction can be provided by applying a resin coating to the bottom surface of the lower chamber 2e. Alternatively, the non-slip portion may be provided by sewing a patch onto the bottom surface of the lower chamber 2e.

In the embodiment described above, the first portion 2a, second portion 2b, and central portion 2c of the main chamber 2d may be formed as a plurality of separate chambers. In this case, the gas injected from the inflator 3 may be directly sent to the first portion 2a, second portion 2b and central portion 2c so that expansion and deployment can be achieved without a time lag.

In the embodiment described above, the configuration indicated in the First Variation and the configuration shown in the Third Variation may be combined. In other words, the lower chamber 2e may be configured as a separate chamber segregated from the main chamber 2d and in communication with the main chamber 2d via a first vent hole 4 provided on the underside of the central portion 2c, and the protruding part 2f may be configured as a separate chamber segregated from the main chamber 2d and in communication with the main chamber 2d via a second vent hole 5 provided on the upper surface of the extended part 2ca of the central portion 2c.

In the embodiment described above, the airbag device 1 may be stowed in the far side part of the passenger seat Sn.

In the embodiment described above, the second vent hole 5 may be provided on the front surface of the extended part 2ca in addition to the upper surface thereof. Alternatively, the second vent hole 5 may be provided only on the front surface of the extended part 2ca.

In the embodiment described above, the cushion 2 and the tether 6 may be joined by any method, such as adhesion, welding, or the like, not limited to sewing, as long as a prescribed strength can be obtained.

In the embodiment described above, the cushion 2 is not limited to a cushion formed by joining a suitable number of base material panels by sewing or the like, but may be formed using a so-called "one-piece weaving" technique.

In the embodiment described above, the airbag device 1 is not limited to being installed in the front seat of the vehicle, but may also be installed in the rear seat. When the second or third row seats of the vehicle are arranged side by side in the width direction of the vehicle, the airbag device 1 may be mounted in a seat in the second or third row.

INDUSTRIAL APPLICABILITY

The present invention is applicable to an airbag device that protects the side of an occupant.

DESCRIPTION OF CODES

1. Airbag device
2. Cushion
2a. First portion
2b. Second portion
2c. Central portion
2ca. Extended part
2d. Main chamber
2e. Lower chamber
2ea. Lower end part
2f. Protruding part
3. Inflator
4. First vent hole
5. Second vent hole
6. Connecting member (tether)
Sd. Seat (driver's seat)
Sn. Seat (passenger seat)
SB. Backrest part
SC. Seat cushion

The invention claimed is:

1. An airbag device installed on a vehicle center side surface of a seat backrest of one of seats arranged side by side in the width direction of the vehicle, comprising:

a cushion; and an inflator that injects gas to expand the cushion, wherein the cushion includes:

a main chamber that expands and deploys on one side of the seat; and a lower chamber extending downward from a part of the main chamber, and the lower chamber is formed so that when expanded and deployed, a lower end part of the lower chamber can come into contact with an upper surface of a console box positioned lower than an upper surface of a seat cushion of the seat or with a floor of the vehicle.

2. The airbag device according to claim 1, wherein the main chamber includes:

a first portion that receives a side of an occupant sitting in one of the seats;

a second portion that receives a side of an occupant sitting in another of the seats; and a central portion provided between the first portion and second portion, and the lower chamber extends downward from the central portion.

3. The airbag device according to claim 2, wherein the main chamber is formed by continuously and integrally forming the first portion, the central portion and the second portion, and the lower chamber is formed as a separate chamber segregated from the main chamber.

4. The airbag device according to claim 3, wherein the main chamber and the lower chamber are in communication through a first vent hole.

5. The airbag device according to claim 4, wherein the inflator is attached to the main chamber and a part of the gas injected from the inflator is supplied from the main chamber, through the first vent hole, and into the lower chamber.

6. The airbag device according to claim 2, further comprising a protruding part provided in the central portion that protrudes in a forward direction of the vehicle at least further than the first portion and the second portion when the cushion is expanded and deployed, and that is capable of receiving a head of the occupant and the occupant moving diagonally forward.

7. The airbag device according to claim 6, wherein the main chamber is formed by continuously and integrally forming the first portion, the central portion and the second portion, and the protruding part is formed as a separate chamber segregated from the main chamber.

8. The airbag device according to claim 7, wherein the main chamber and the protruding part are in communication through a second vent hole.

9. The airbag device according to claim 6, further comprising a connecting member connecting a lower front portion of the protruding part and a bottom front portion of the lower chamber.

10. The airbag device according to claim 6, further comprising a connecting member connecting a lower front portion of the protruding part and a lower front portion of the central portion.

* * * * *